United States Patent [19]

Dunn

[11] 4,437,753
[45] Mar. 20, 1984

[54] APPARATUS FOR SUPPORTING A CAMERA AGAINST THE STERNUM OF THE PHOTOGRAPHER

[76] Inventor: Robert E. Dunn, P.O. Box 1579, Cupertino, Calif. 95015

[21] Appl. No.: 310,214

[22] Filed: Oct. 9, 1981

[51] Int. Cl.³ .............................................. G03B 17/00
[52] U.S. Cl. .................................... 354/293; 354/82; 352/243; 248/169; 248/181; 248/187
[58] Field of Search .......................... 354/81, 82, 293; 352/243; 248/168, 169, 181, 187; D16/5

[56] References Cited

U.S. PATENT DOCUMENTS

| | | |
|---|---|---|
| D. 230,082 | 1/1974 | Adams . |
| D. 230,083 | 1/1974 | Adams . |
| 1,805,185 | 5/1931 | Ramsey . |
| 2,370,611 | 2/1945 | DuMais . |
| 2,552,205 | 8/1948 | Moss . |
| 2,658,435 | 11/1953 | Sarvoy ................................ 354/82 |
| 2,771,826 | 11/1956 | Shapiro . |
| 2,806,416 | 9/1957 | Jones, Jr. . |
| 2,952,200 | 9/1960 | Welch . |
| 3,101,035 | 8/1963 | Williams . |
| 3,434,406 | 3/1969 | Aune et al. . |
| 3,882,554 | 5/1975 | Rauscher . |
| 4,177,966 | 12/1979 | Marchus . |
| 4,244,500 | 1/1981 | Founier ................................ 354/81 |
| 4,306,790 | 12/1981 | Adams ................................ 354/82 |

OTHER PUBLICATIONS

Photocopy of magazine advertisement (Exact source presently unknown).

Primary Examiner—A. A. Mathews
Attorney, Agent, or Firm—Fulwider, Patton, Rieber, Lee & Utecht

[57] ABSTRACT

A camera support for use in stabilizing a handheld camera against movement, wherein the camera is fixed to a pedestal having two attached support arms which contact the photographer's body to stabilize the camera. Preferably, the two support arms contact the shoulder and sternal regions of the photographer's body for the best stabilization of the camera. Both support arms are adjustable, and the angular orientation and length of the second support arm may be adjusted independently of the angular orientation and length of the first support arm. Other aids to supporting the camera may be used in conjunction with the camera support.

13 Claims, 8 Drawing Figures

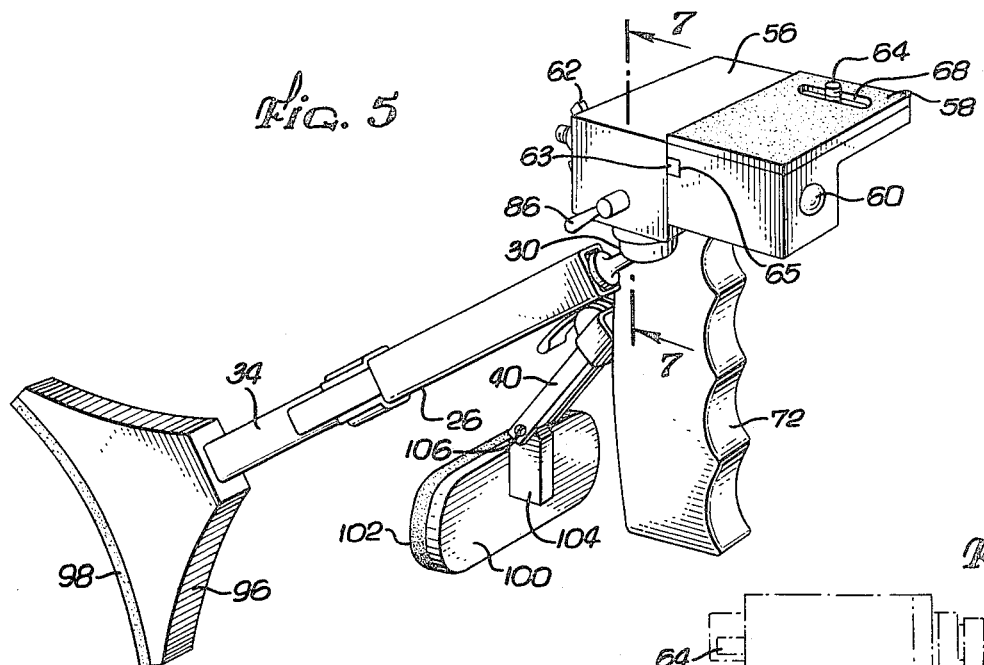
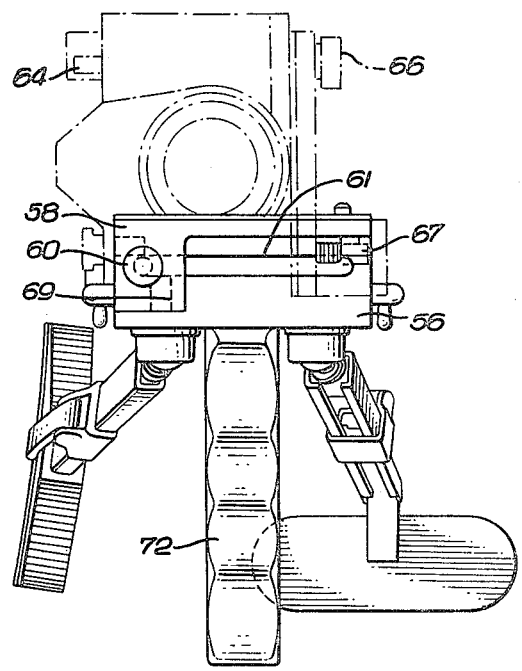
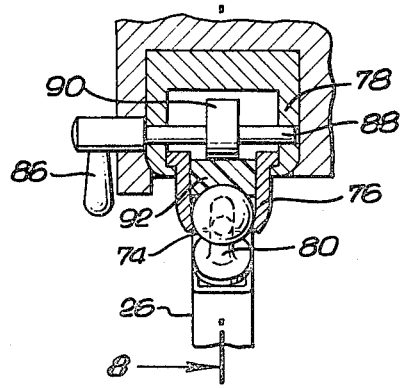
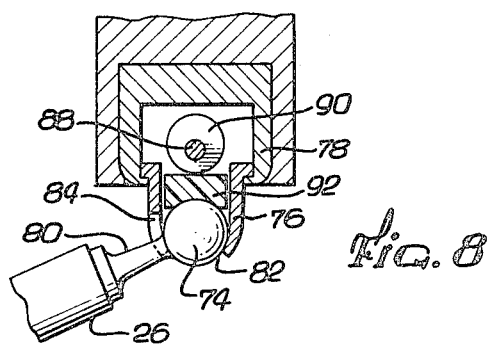

APPARATUS FOR SUPPORTING A CAMERA AGAINST THE STERNUM OF THE PHOTOGRAPHER

FIELD OF THE INVENTION

This invention relates generally to a support for use with a hand-held camera and, more particularly, to a support which allows the camera to be stabilized by contact with the photographer's body.

BACKGROUND OF THE INVENTION

When a photograph is taken using a hand-held camera, the camera is usually grasped by the photographer in one hand and positioned in the proximity of the photographer's face. In this position, the photographer can sight through the viewfinder of the camera, select the scene to be photographed and then operate the shutter release mechanism.

It is sometimes difficult to hold the camera steady while the shutter is open. When a person's arms remain in the position required to hold the camera in the proximity of his face more than a few seconds, tensions develop in the hand, wrist and arm. The natural result of this tension is a reflexive high-frequency shaking, with resulting camera movement that blurs the recorded image. This problem is particularly acute where the camera is heavy, a long telephoto lens is used, the photographer is working in an awkward position, the photographer must hold a position for a length of time waiting for a particular scene to occur, and where long exposure times are required because of low light conditions or to increase the depth of field. To assist photographers in lengthening the exposure time during which a camera may be held steady, various types of apparatus have been proposed.

The most common apparatus for stabilizing a camera is a tripod extending from the camera to the ground, thereby relieving the photographer of the burden of holding the camera and simultaneously eliminating the problem of reflexive movements. However, it is sometimes not convenient to utilize a tripod, since tripods are often heavy and inconvenient to carry, and additionally a proper horizontal ground support surface may not be available.

An alternative approach to stabilizing the camera is to support the camera against the body of the photographer, although the disadvantages and shortcomings of known devices of this type have prevented their widespread use. As an example of this previously known approach, however, the camera may be attached to a harness fitting around the neck of the photographer, and optionally a brace to some other portion of the photographer's body is also provided. In another approach, the camera is braced against the photographer's chest using a Y-shaped member.

Although some of these approaches may reduce high-frequency shaking of the camera to some extent, they introduce other sources of movement so that their performance falls far short of the free-standing tripod. When braced against or supported by the photographer's neck, waist or lateral portions of the torso, a camera will generally be shaken by the pulse produced in the arteries or blood vessels in that portion of the body. Minor muscle movements in these portions of the body also will be transmitted into the camera. Further camera movement may also be attributable to breathing, particularly in the case of previously known devices supported by the chest or abdomen.

Accordingly, it is a primary objective of this invention to provide a camera support characterized by improved stability as compared to other body-mounted support apparatus. A further objective is the provision of such a support in a structure which can also utilize such stationary support surfaces as may be available.

SUMMARY OF THE INVENTION

The present invention resides in a camera support for use with a hand-held camera, the camera support having two independently adjustable support arms for stabilizing the camera against the body of the photographer. One arm carries a shoulder support means that contacts and grips the shoulder, preferably having a concave shoulder-engaging surface similar to that of a rifle stock. The other arm carries a sternal support means, preferably a relatively flat pad adapted to rest against the sternum. The pad may be connected to the arm by a hinge to adapt to the contour of the photographer's body.

The use of the sternum to stabilize the camera provides a surprisingly solid supporting surface, more so than any other part of the upper body, thereby decreasing undesired camera movement. The sternum is the part of the human skeletal structure which connects the upper ribs in front and is otherwise known as the breastbone. It is a bony structure having no significant blood vessels or arteries and consequently no detectable pulse. Use of the sternal area as the main support surface significantly reduces shaking of the camera due to heartbeat as compared with other bodily support surfaces. Further, no muscle tissue is present on the central portion of the chest overlying the sternum and it is relatively unaffected by muscle movement in other parts of the body. The sternal support therefore rests directly on the bony structure with only the skin interposed, thereby reducing shaking of the camera from involuntary or voluntary muscle movement. Supplemental lateral stability of the camera that prevents pivotal movement is provided by the shoulder support.

Both support arms can be independently adjustable, and the angular orientation and length of the second support arm may be adjusted independently of the angular orientation and length of the first support arm. Accordingly, the photographer may quickly and conveniently adjust one support arm to contact his sternum and the other to contact his shoulder, thereby bracing the camera against the two most stable surfaces of the body. The support arms may also be utilized to brace the camera against other available stable surfaces such as a wall or in conjunction with a support member extending to the ground.

More specifically, the camera support comprises a pedestal for mounting the camera and two adjustable support arms attached to the pedestal. The camera is fixed to the pedestal. In the preferred embodiment, the pedestal is composed of a base and a rotatable camera platform, with the camera fixed to the camera platform to allow rotation of the camera in the vertical plane. The two support arms are mounted to the pedestal by ball-and-socket joints, allowing adjustment of the angular orientation of each arm. Each support arm is extensible to enable adjustment of its length. A sternum support is fixed to the remote end of one arm and a shoulder support is fixed to the remote end of the other arm.

In stabilizing a camera with the camera support of the invention, the support arm having the shoulder support is adjusted so that the shoulder support contacts the photographer's left or right shoulder, and so that the camera viewfinder is located to allow the photographer to utilize it to select the scene. Next, the support arm having the sternal support is adjusted to achieve contact with the photographer's sternum. The photographer then grasps the camera in normal fashion and presses the sternal support and shoulder support against his body.

It will be appreciated from the foregoing that the present invention represents an advance in the field of apparatus to support and stabilize a camera. With this camera support, the camera may be supported and braced against the photographer's body, thereby reducing the movement of the camera during exposure of the film. Other features and advantages of the present invention will become apparent from the following more detailed description taken in conjunction with the accompanying drawings which illustrate, by way of example, the principles of the invention.

BRIEF DESCRIPTION OF THE DRAWINGS

FIG. 5 is an enlarged perspective view illustrating the use of a grip in conjunction with the camera support.

FIG. 6 is a front elevational view illustrating alternative rotational positions of the camera platform.

FIG. 7 is a detailed fragmented sectional view taken along line 7—7 of FIG. 5, illustrating detail of the ball-and-socket joint.

FIG. 8 is a detailed fragmented sectional view taken along line 8—8 of FIG. 7, illustrating the cam for locking the ball-and-socket joint.

DESCRIPTION OF THE PREFERRED EMBODIMENT

Figure 1:
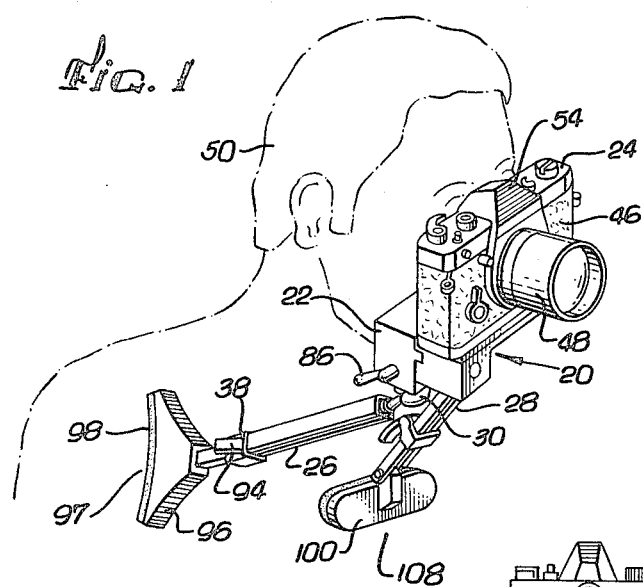
FIG. 1 is a perspective view of the camera support illustrating a camera mounted on the camera support and the positioning of the camera and support when the camera is supported entirely against the body of the photographer.

As shown in the drawings for purposes of illustration, the present invention is concerned with a camera support 20 for use with hand-held cameras. The camera support 20 includes a pedestal 22 for mounting a camera 24, an adjustable first support arm 26 adapted for contacting the photographer's shoulder and an adjustable second support arm 28 adapted for contacting the photographer's sternal area, thereby stabilizing the camera 24 against relatively immovable surfaces when photographs are taken.

In accordance with the present invention, both the angular orientation and length of the first support arm 26 and the second support arm 28 may be adjusted. The first support arm 26 is attached to the pedestal 22 by a first ball-and-socket joint 30, which allows the first support arm 26 to be adjusted over a wide range of angular orientations and then locked into a selected position. Similarly, the second support arm 28 is attached to the pedestal 22 by a second ball-and-socket joint 32, which allows the angular orientation of the second support arm 28 to be adjusted.

The construction of the support arms 26 and 28 allows the length of each support arm 26 and 28 to be adjusted. The first support arm 26 includes a first support arm inner channel 34 mounted colinearly with and slidably related to a first support arm outer channel 36. The length of the first support arm 26 may be adjusted by sliding the first support arm inner channel 34 to a desired position and then locking the first support arm inner channel 34 in relation to the first support arm outer channel 36 with a first extension lock 38. The second support arm 28 includes a second support arm inner channel 40 colinearly with and slidably related to a second support arm outer channel 42, allowing the second support arm 28 to be extended to a selected length and then locked into position by a second extension lock 44. The construction of the camera support 20 allows the first support arm 26 and the second support arm 28 to be adjusted fully independently in both angular orientation and length.

A wide variety of hand-held cameras may be used with the camera support 20. By way of illustration, a typical camera 24 includes a camera body 46 for containing the film to be exposed. An optical system for focusing the admitted light on the film is contained within a lens 48 mounted to the camera body 46. A shutter contained within the camera body 46 is normally interposed between the light passing through the lens 46 and the film to be exposed. The shutter is opened during exposure when the photographer 50 operates a shutter release 52. The photographer 50 sights through a viewfinder 54 to select a scene for photographing. Other features included in typical cameras include provision for loading, removing and advancing the film, a light meter, and a self-timer. While the described embodiment is directed toward a camera support, other embodiments could be used to support similar devices with like requirements for stability.

The camera support 20 includes the pedestal 22, and the first support arm 26 and the second support arm 28 attached thereto. In a preferred embodiment, the pedestal 22 includes a base 56 and a camera platform 58. The camera platform 58 is attached to the base 56 by a platform support bolt 60 extending through the camera platform 58 and a slot 61 in the base 56 and secured by a platform adjustment nut 62. With the camera in the position illustrated in FIG. 1, undesired rotation of the camera platform 58 with respect to the base 56 is prevented by engagement of a tab 63 extending from the base 56, with a slot 65 in the camera platform 58. Engagement of the tab 63 into the slot 65 is accomplished by sliding the platform support bolt 60 supporting the camera platform 58 along the slot 61. In this position, the underside of the camera platform 58 rests against a projection 67 extending from the base 56 to further support the camera platform 58.

The camera 24 is secured to the camera platform 58 by a camera attachment bolt 64 extending through the camera platform 58. The camera attachment bolt 64 engages threads in the lower portion of the camera body 46 and is tightened in these threads by rotating a knurled knob 66. The camera attachment bolt 64 is mounted in a camera attachment slot 68, extending through the camera platform 58.

For typical cameras the exposure area of the film is rectangular in shape, with the long dimension of the rectangle in the horizontal plane when the camera is held as illustrated in FIG. 1. For some photographic scenes, it is desirable to rotate the camera in the vertical plane to take better advantage of a rectangular film format. In a preferred embodiment of the camera support 20, the camera 24 attached to the camera platform 58 may be rotated so that the long dimension of the exposed area is in the vertical plane by rotating the camera platform 58 with respect to the base 56, as illustrated by the phantom lines in FIG. 6. Rotation is accomplished as illustrated in FIG. 6 by loosening the platform adjustment nut 62, sliding the camera support bolt 60 along the slot 61 to disengage the tab 63 from the slot 65, rotating the camera platform 58 and the attached camera 24 about the platform support bolt 60 to the desired position, engaging the projection 67 with a cutout 69 in the camera platform to provide a lock against turning of the camera platform 58 relative to the base 56, and retightening the platform adjustment nut 62.

The first support arm 26 and the second support arm 28 are attached to the base 56 for stabilizing the camera 24 against available support surfaces. Additionally, a optional hand grip 72 extending generally downwardly may be mounted to the base 56 to provide a convenient method of grasping the camera support 20 in one hand, with the support arms 26 and 28 thereby forced against the photographer's body.

The first support arm 26 is secured to the base 56 by attachment means allowing adjustment and locking of the angular orientation of the first support arm 26 with respect to the base 56. Preferably, the attachment means allowing adjustment permits a universal movement of the first support arm 26. In the presently preferred embodiment, the attachment means is the first ball-and-socket joint 30. As illustrated in FIGS. 7 and 8, the first support arm 26 is attached to a ball 74, which is free to move within a socket 76. The socket 76 is retained by a socket housing 78, and the socket 76 may be rotated in the horizontal plane within the socket housing 78. A ball attachment 80 extends through the socket opening 82 in the socket 76. Additionally, a portion of the wall of the socket 76 is removed to form a socket clearance recess 84.

The angular orientation of the first support arm 26 may be adjusted over a wide range in the vertical plane by rotating the ball 74 within the socket 76 so that the ball attachment 80 extends through the socket opening 82 or the socket clearance recess 84. The angular orientation of the first support arm 26 may be varied in the horizontal plane by rotating the socket 76 within the socket housing 78. Angular orientation adjustment within the horizontal and vertical planes may thereby be combined over a wide range of positions.

When a desired angular orientation has been achieved, the position may be locked by turning the support arm locking knob 86. The support arm locking knob 86 is carried on a shaft 88. An eccentric cam 90 mounted on the shaft 88 is positioned for contacting a locking block 92. When the support arm locking knob 86 is turned, the cam 90 tightens against the locking block 92. The pressure from the locking block 92 forces the ball 74 against the walls of the socket 76, thereby frictionally locking the position of the ball 74 within the socket 76, and simultaneously frictionally locking the position of the socket 76 within the socket housing 78. Rotation of the support arm locking knob 86 thereby conveniently and quickly locks the first support arm 26 in the position selected. Subsequent adjustment of the first support arm 26 is achieved by unlocking the support arm locking knob 86, changing the angular orientation of the first support arm 26 and relocking the support arm locking knob 86.

The first support arm 26 is provided with means for extending the length of the first support arm 26 and locking the first support arm 26 at the desired length. In the presently preferred embodiment, extension is accomplished by constructing the first support arm 26 as two colinear, slidably related channel sections. The first support arm outer channel 36 is of a generally U-shaped configuration and is joined to the ball attachment 80. The first support arm inner channel 34 is also of generally U-shaped configuration but of smaller cross-sectional dimension than the first support arm outer channel 36, so that the first support arm inner channel 34 may be inserted into and lie colinear with the first support arm outer channel 36. The first support arm inner channel 34 slides within the first support arm outer channel 36, thereby increasing or decreasing the total length of the first support arm 26.

The lengthwise extension of the first support arm inner channel 34 in relation to the first support arm outer channel 36 may be locked by a first extension lock 38. Depressing the first locking lever 94 tightens the first extension lock 38 about the first support arm outer channel 36, thereby forcing the first support arm outer channel 36 into a tight friction contact with the first support arm inner channel 34.

Means for contacting the photographer's body is joined to the end of the first support arm inner channel 34 remote from the first ball-and-socket joint 30. A shoulder support 96 is constructed of a rigid molded plastic material, generally concavely shaped in the manner of a rifle stock to conform to the surface of the shoulder 97 of the photographer 50 when contacted to the shoulder 97 along a generally vertically-disposed contact area. The surface of the shoulder support 96 intended for contact with the shoulder 97 is provided with a high-friction cushion 98 that firmly grips the shoulder.

The second support arm 28 is constructed in a manner generally similar to the first support arm 26. The second support arm 28 is joined to the oppositely disposed end of the base 56 by a second means for adjusting the angular orientation of the second support arm 28. The second means for supporting the second support arm 28 operates entirely independently of the first means for supporting the first support arm 26. Preferably, the second means permits a universal movement of the second support arm 28. The second means for changing the angular orientation of the second support arm 28 is a second ball-and-socket joint 32. The second ball-and-socket joint 32 is of similar construction to the first ball-and-socket joint 30 described previously in relation to FIG. 7 and FIG. 8, and its locking is controlled by a second support arm locking knob 99.

Similarly, the second support arm 28 is provided with means for adjusting the length of the second support arm 28. The construction of the second support arm 28 is generally similar to that of the first support arm 26 described above. The second support arm 28 includes a second support arm outer channel 42 joined to the second ball-and-socket joint 32, and the second support arm inner channel, 40 colinear with and slidably related to the second support arm outer channel 42. The length of the second support arm 28 may be fixed and locked by the second extension lock 44, which is identical to the first extension lock 38.

In the preferred embodiment, a sternal support 100 covered by a second cushion 102 is attached to the end of the second support arm inner channel 40 remote from the second ball-and-socket joint 32. The sternal support 100 is attached to a sternal support mount 104. The sternal support mount 104 is joined to the second support arm inner channel 40 by a hinge 106.

In circumstances when the body of the photographer 50 provides the most suitable and convenient support surface available, it has been found that a stable support of the camera 24 is achieved when the camera support 20 rests against (1) the central portion of the photographer's chest 108, overlying the sternum, and (2) one of the photographer's shoulders 97. It is therefore desirable that the sternal support 100 be of a generally flat shape and hinged so that the second support arm 28 conveniently fits against the central portion of the photographer's chest 108 conforming to the configuration of his body.

As described above, in the presently preferred embodiment the first support arm 26 and the second support arm 28 are joined to the base 56 at oppositely disposed ends thereof. Alternatively, the first support arm 26 and the second support arm 28 may be joined to the base 56 at adjacent positions or in a vertical relation, with the first ball-and-socket joint 30 located above the second ball-and-socket joint 32 in a vertical plane.

To use the camera support 20 to support and stabilize a camera 24, the camera 24 is first attached to the camera platform 58 by engaging camera attachment bolt 64 in the threads provided on the underside of the camera body 46. To adjust the camera support 20 for stabilizing the camera 24 against the photographer's body, the photographer 50 loosens the support arm locking knobs 86 and 99 and adjusts the angular orientation of the support arms 26 and 28 to contact his upper body, preferably so that the sternal support 100 contacts the photographer's chest 108 in the area of the sternum, and the shoulder support 96 contacts the surface of the photographer's shoulder 97. The angular orientations are then fixed by locking the support arm locking knobs 86 and 99. The length of the first support arm 26 is then adjusted and locked to bring the sternal support 100 into contact with the photographer's chest 108 so that the viewfinder 54 is in convenient proximity to the eye of the photographer 50. The position of the shoulder support 96 against the photographer's shoulder 97 is then determined by adjusting and locking the length of the first support arm 26. Further adjustments to the ball-and-socket joints 30 and 32 and the lengths of the support arms 26 and 28 may be made as necessary.

Figure 2:
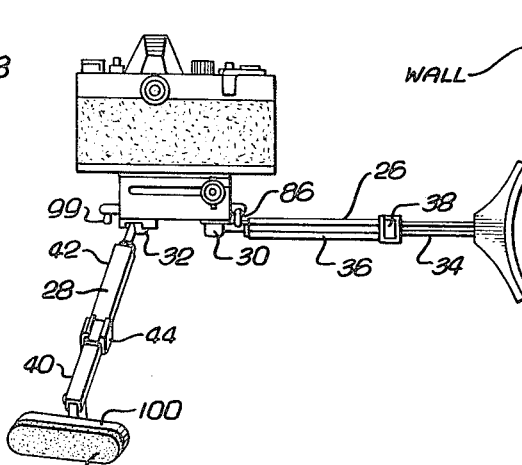
FIG. 2 is a rear elevational view of the camera support, illustrating the use of a wall as a support surface.
Figure 3:
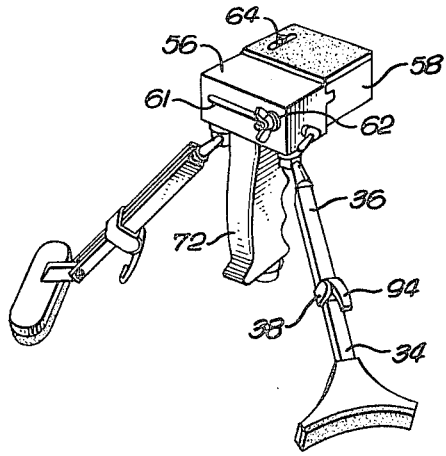
FIG. 3 is a perspective view of the camera support, illustrating the use of the support arms and grip for stabilization against a horizontal flat surface.
Figure 4:
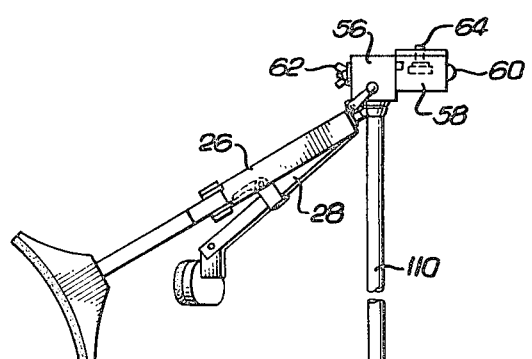
FIG. 4 is a side elevational view illustrating the use of the camera support in conjunction with a support rod.
Figure 4:
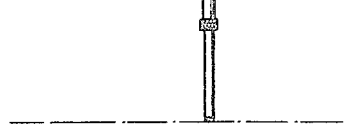

The independently adjustable support arms 26 and 28 allow the photographer some flexibility in choice and utilization of the best available support surfaces. Placing both support arms 26 and 28 against the photographer's body has been described previously in relation to FIG. 1. As illustrated in FIG. 2, one support arm may be stabilized against an available structural surface such as a wall, and the other may be placed against the photographer's body. In those embodiments where the hand grip 72 is provided, the hand grip 72 and the support arms 26 and 28 may be utilized for stabilizing against a horizontal surface, as illustrated in FIG. 3. In yet another embodiment illustrated in FIG. 4, an extensible support rod 110 is utilized to stabilize the camera 24 against an available flat surface, and the support arms 26 and 28 are placed against the photographer's body. The uses illustrated in FIGS. 1–4 are intended to be exemplary rather than exhaustive.

Photography is a highly subjective field, with photographic quality depending significantly upon the skill of the photographer and the judgments of the viewer of the photograph. Nevertheless, experience has shown that significant improvements in photograph quality are achieved with the camera support of this invention. For example, when a skilled photographer uses a hand-held 35 mm single lens reflex camera with a 200 millimeter lens without the camera support, it is typical that the picture quality unavoidably deteriorates noticably and significantly due to movement of the camera if the exposure time is longer than about 1/60 second. If the camera is supported against the photographer's body by the camera support of the invention, good photographic quality is achieved with exposures as long as 1 second or more in the case of a highly skilled user. In another example, good exposures of as long as 1/15 second may be made with a single lens reflex camera and 400 millimeter lens using the camera support.

The dramatic increase in exposure time possible with the camera support allows photographs to be taken in low light areas. It also allows photographs with greater depth of field, since for a particular film and light condition a smaller aperture may be used with a longer exposure.

It will now be appreciated that, through the use of this invention, the photographer's body may be used very effectively to stabilize the camera against motion when a photograph is taken. Although a particular embodiment of the invention has been described in detail for purposes of illustration, various modifications may be made without departing from the spirit and scope of the invention. Accordingly, the invention is not to be limited except as by the appended claims.

I claim:

1. A camera support for stabilizing a camera against the body of a photographer, comprising:
    a pedestal for mounting the camera, said pedestal having a portion thereof extending rearwardly of the camera;
    a first arm adjustably joined to said pedestal;
    shoulder support means for engaging the shoulder of the photographer, said shoulder support means being attached to the end of said first arm remote from said pedestal;
    a second arm adjustably joined to said portion of said pedestal extending rearwardly of the camera; and
    sternal support means for engaging the sternum of the photographer, said sternal support means being attached to the end of said second arm remote from said pedestal.

2. The camera support of claim 1, wherein said sternal support means is a relatively flat pad.

3. The camera support of claim 2, further comprising hinge means for moveably attaching said sternal support means to said second arm, whereby said sternal support means can adapt to the contour of the photographer's body.

4. The camera support of claim 1, wherein said shoulder support means includes a concave surface for contacting and gripping the shoulder of the photographer in a generally vertically-disposed contact area.

5. The camera support of claim 1, further comprising joint means for adjustably connecting one of said arms to said pedestal, said joint means permitting universal movement of said one of said arms relative to said pedestal.

6. The camera support of claim 5, wherein said joint means is a ball-and-socket joint.

7. The camera support of claim 1, further comprising means for adjusting the length of one of said arms.

8. The camera support of claim 1, wherein said pedestal includes a base and a camera platform rotatably joined to said base, said camera platform including means for securing the camera to said camera platform.

9. The camera support of claim 1, further comprising a hand grip extending generally downwardly from said pedestal.

10. For use by a photographer in stabilizing a camera, a camera support comprising:
    a base;
    a camera platform rotatably joined to said base, said camera platform including means for attaching the camera;
    a first arm joined to said base by a ball-and-socket joint, said first arm including means for adjusting the length thereof;
    a shoulder support attached to the end of said first arm remote from said base;
    a second arm joined to said base by a ball-and-socket joint, said second arm including means for adjusting the length of said second arm; and
    a sternal support attached to the end of said second arm remote from said base.

11. The camera support of claim 10, further including a hand grip attached to said base and extending downwardly therefrom.

12. For use by a photographer in stabilizing a camera, a camera support comprising:
    a base;
    a camera platform joined to said base, said camera platform including means for attaching the camera;
    a first arm adjustably joined to said base, said first arm including means for adjusting the length thereof;
    a shoulder suport attached to the end of said first arm remote from said base;
    a second arm adjustably joined to said base, said second arm including means for adjusting the length thereof; and
    a sternal support attached to the end of said second arm remote from said base.

13. The camera support of claim 12, further including a hand grip attached to said base and extenidng downwardly therefrom.

* * * * *